(12) United States Patent
Lansel

(10) Patent No.: US 12,436,391 B2
(45) Date of Patent: Oct. 7, 2025

(54) DISPLAYS WITH VERGENCE DISTANCE FOR EXTENDED REALITY DEVICES

(71) Applicant: Meta Platforms Technologies, LLC, Menlo Park, CA (US)

(72) Inventor: Steven Paul Lansel, Apopka, FL (US)

(73) Assignee: Meat Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/484,215

(22) Filed: Oct. 10, 2023

(65) Prior Publication Data

US 2025/0116864 A1 Apr. 10, 2025

(51) Int. Cl.
    *G02B 27/01* (2006.01)
    *G06F 3/01* (2006.01)
    *G06T 19/00* (2011.01)

(52) U.S. Cl.
    CPC ..... *G02B 27/0172* (2013.01); *G02B 27/0179* (2013.01); *G06F 3/013* (2013.01); *G06T 19/006* (2013.01); *G02B 2027/014* (2013.01); *G02B 2027/0181* (2013.01)

(58) Field of Classification Search
    CPC ............ G02B 27/0172; G02B 27/0179; G02B 2027/014; G02B 2027/0181; G02B 27/017; G02B 27/0093; G02B 2027/0187; G02B 2027/0134; G06F 3/013; G06F 3/011; G06T 19/006
    See application file for complete search history.

(56) References Cited

U.S. PATENT DOCUMENTS

| 10,241,329 B2 | 3/2019 | Perreault et al. |
| 10,401,953 B2 | 9/2019 | Bognar et al. |
| 10,627,901 B2 | 4/2020 | Raskar et al. |
| 10,679,410 B2 | 6/2020 | Terrano |
| 10,871,825 B1 | 12/2020 | Sztuk et al. |

(Continued)

FOREIGN PATENT DOCUMENTS

WO      2020086244 A1      4/2020

OTHER PUBLICATIONS

International Search Report and Written Opinion for International Application No. PCT/IB2024/060009, mailed Dec. 16, 2024, 12 pages.

*Primary Examiner* — Yaron Cohen
(74) *Attorney, Agent, or Firm* — Greenberg Traurig, LLP

(57) ABSTRACT

A method implemented by a computing device includes rendering on a first display and a second display of the computing device an extended reality (XR) environment, and determining a context of the XR environment with respect to a user. Determining the context includes determining characteristics associated with each eye of the user with respect to virtual content displayed within the XR environment. The method includes determining, based on the characteristics, a mapping of a first set of coordinates of the virtual content as displayed on the first display and a second set of coordinates of the virtual content as displayed on the second display, generating, based on the mapping of the first set of coordinates and the second set of coordinates, composite virtual content to be rendered on the first display and the second display; and re-rendering on the first display and the second display the composite virtual content.

20 Claims, 6 Drawing Sheets
(1 of 6 Drawing Sheet(s) Filed in Color)

(56) References Cited

U.S. PATENT DOCUMENTS

| | | |
|---|---|---|
| 10,878,620 B2 | 12/2020 | Schwab et al. |
| 11,132,056 B2 | 9/2021 | Sztuk et al. |
| 11,290,706 B2 | 3/2022 | Edwin et al. |
| 11,662,588 B2 | 5/2023 | Miller, IV et al. |
| 11,734,808 B2 | 8/2023 | Rao Padebettu et al. |
| 2018/0239145 A1 | 8/2018 | Lanman et al. |
| 2020/0043236 A1 | 2/2020 | Miller et al. |
| 2024/0103615 A1* | 3/2024 | Huergo Wagner ..... G06F 3/012 |

* cited by examiner

DISPLAYS WITH VERGENCE DISTANCE FOR EXTENDED REALITY DEVICES

This disclosure generally relates to extended reality devices, and, more specifically, to displays with vergence distance for extended reality devices.

BACKGROUND

An extended reality (XR) environment may generally include a real-world environment that includes XR content overlaying one or more features of the real-world environment and/or a fully immersive virtual environment in which a user may navigate and experience using one or more user avatars. In typical XR systems, image data may be rendered on, for example, a robust head-mounted display (HMD) that may be coupled through a physical wired or wireless connection to a base graphics generation device responsible for generating the image data. In some instances, a user may be immersed within an XR environment for an extended period of time, and thus, in some instances, may be discomforted. For example, vergence-accommodation conflict (VAC) may reduce comfort and visual clarity when viewing content requiring a different vergence and accommodation. It may be thus useful to provide techniques to improve XR systems.

SUMMARY OF CERTAIN EMBODIMENTS

The present embodiments include techniques for providing displays with images requiring certain vergence distance for extended reality (XR) devices. In certain embodiments, a computing device configured to be worn by a user may render on a first display and a second display of the computing device an extended reality (XR) environment. For example, in some embodiments, prior to rendering on the first display and the second display the XR environment, the computing device may determine a geometry of the first display and the second display. In certain embodiments, determining the geometry of the first display and the second display may include determining one or more of a location of the first display and the second display, an orientation of the first display and the second display, or a shape of the first display and the second display.

In certain embodiments, the computing device may then determine a context of the XR environment with respect to the user. For example, in some embodiments, the computing device may determine the context by determining one or more characteristics associated with each eye of the user with respect to virtual content displayed within the XR environment. In certain embodiments, determining a context of the XR environment with respect to the user may include determining one or more of a head pose of the user or an eye gaze of the user. In certain embodiments, the computing device may then determine, based on the one or more characteristics associated with each eye of the user, a mapping of a first set of coordinates of the virtual content as displayed on the first display and a second set of coordinates of the virtual content as displayed on the second display. For example, in some embodiments, the computing device may determine the mapping of the first set of coordinates and the second set of coordinates by determining one or more of a desired vergence distance or a desired interpupillary distance.

In certain embodiments, the computing device may then generate, based on the mapping of the first set of coordinates and the second set of coordinates, composite virtual content to be rendered on the first display and the second display. For example, in some embodiments, prior to generating the composite virtual content to be rendered on the first display and the second display, the computing device may generate, based on the mapping of the first set of coordinates and the second set of coordinates, two-dimensional (2D) content of the virtual content and three-dimensional (3D) content of the virtual content. In certain embodiments, the computing device may thus generate the composite virtual content to be rendered on the first display and the second display by merging together the 2D content of the virtual content and the 3D content of the virtual content. In certain embodiments, the computing device may then re-render on the first display and the second display the composite virtual content.

The embodiments disclosed herein are only examples, and the scope of this disclosure is not limited to them. Certain embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

One or more drawings included herein are in color in accordance with 37 CFR § 1.84. The color drawings are necessary to illustrate the invention.

DESCRIPTION OF EXAMPLE EMBODIMENTS

Figure 1:
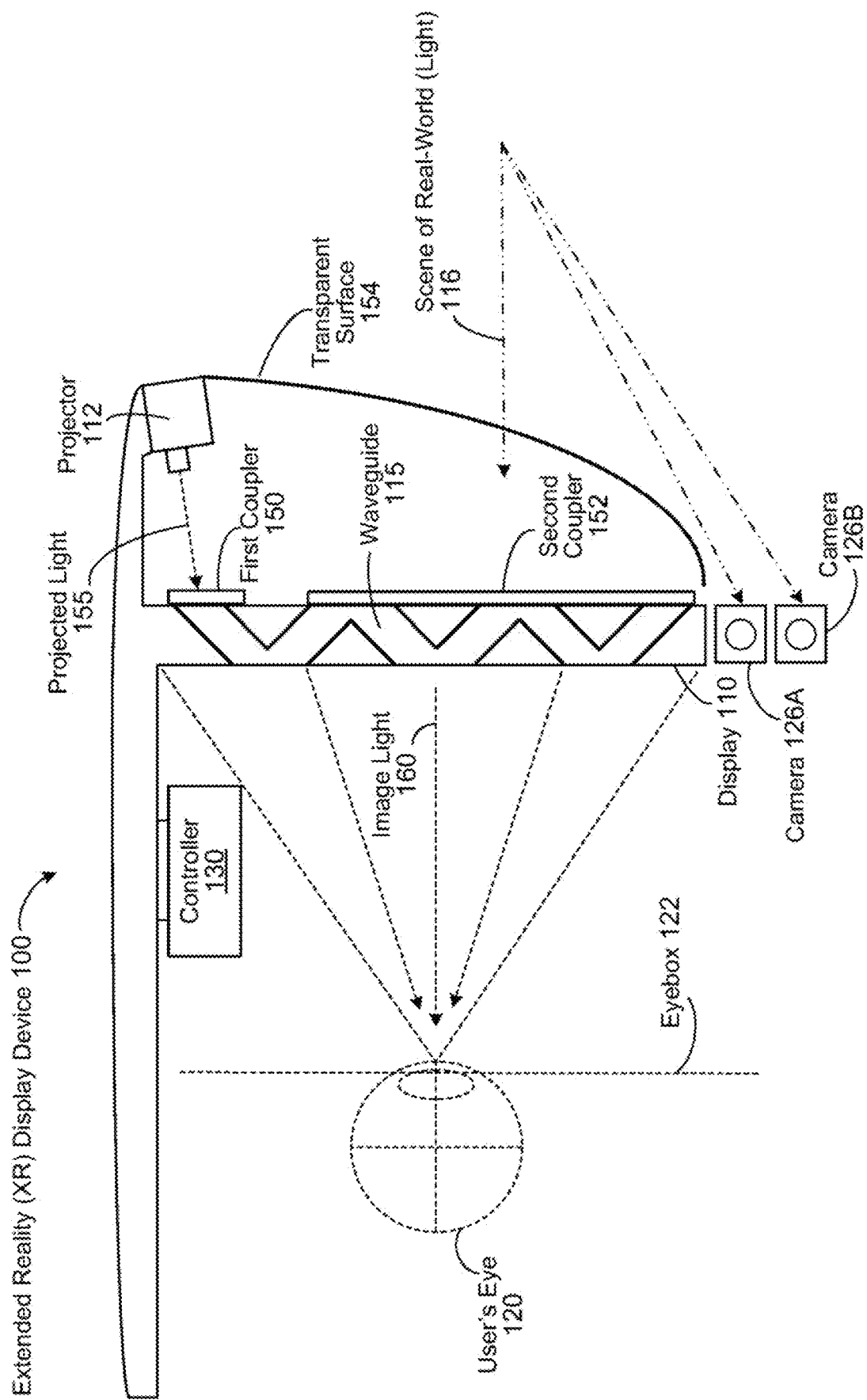
FIG. 1 illustrates an example embodiment of an extended reality (XR) system.

An extended reality (XR) environment may generally include a real-world environment that includes XR content overlaying one or more features of the real-world environment and/or a fully immersive virtual environment in which a user may navigate and experience using one or more user avatars. In typical XR systems, image data may be rendered on, for example, a robust head-mounted display (HMD) that may be coupled through a physical wired or wireless connection to a base graphics generation device responsible for generating the image data. In some instances, a user may be immersed within an XR environment for an extended period of time, and thus, in some instances, may be discomforted. For example, vergence-accommodation conflict (VAC) may reduce comfort and visual clarity when viewing content requiring a different vergence and accommodation. It may be thus useful to provide techniques to improve XR systems.

Accordingly, the present embodiments include techniques for providing displays with vergence distance for extended reality (XR) devices. In certain embodiments, a computing device configured to be worn by a user may render on a first display and a second display of the computing device an extended reality (XR) environment. For example, in some embodiments, prior to rendering on the first display and the second display the XR environment, the computing device may determine a geometry of the first display and the second display. In certain embodiments, determining the geometry of the first display and the second display may include determining one or more of a location of the first display and the second display, an orientation of the first display and the second display, or a shape of the first display and the second display.

In certain embodiments, the computing device may then determine a context of the XR environment with respect to the user. For example, in some embodiments, the computing device may determine the context by determining one or more characteristics associated with each eye of the user with respect to virtual content displayed within the XR environment. In certain embodiments, determining a context of the XR environment with respect to the user may include determining one or more of a head pose of the user or an eye gaze of the user. In certain embodiments, the computing device may then determine, based on the one or more characteristics associated with each eye of the user, a mapping of a first set of coordinates of the virtual content as displayed on the first display and a second set of coordinates of the virtual content as displayed on the second display. For example, in some embodiments, the computing device may determine the mapping of the first set of coordinates and the second set of coordinates by determining one or more of a desired vergence distance or a desired interpupillary distance.

In certain embodiments, the computing device may then generate, based on the mapping of the first set of coordinates and the second set of coordinates, composite virtual content to be rendered on the first display and the second display. For example, in some embodiments, prior to generating the composite virtual content to be rendered on the first display and the second display, the computing device may generate, based on the mapping of the first set of coordinates and the second set of coordinates, two-dimensional (2D) content of the virtual content and three-dimensional (3D) content of the virtual content. In certain embodiments, the computing device may thus generate the composite virtual content to be rendered on the first display and the second display by merging together the 2D content of the virtual content and the 3D content of the virtual content. In certain embodiments, the computing device may then re-render on the first display and the second display the composite virtual content accurately mapped based on the calculated mapping.

As used herein, "extended reality" may refer to a form of electronic-based reality that has been manipulated in some manner before presentation to a user, including, for example, virtual reality (VR), augmented reality (AR), mixed reality (MR), hybrid reality, simulated reality, immersive reality, holography, or any combination thereof. For example, "extended reality" content may include completely computer-generated content or partially computer-generated content combined with captured content (e.g., real-world images). In some embodiments, the "extended reality" content may also include video, audio, haptic feedback, or some combination thereof, any of which may be presented in a single channel or in multiple channels (such as stereo video that produces a three-dimensional (3D) effect to the viewer). Furthermore, as used herein, it should be appreciated that "extended reality" may be associated with applications, products, accessories, services, or a combination thereof, that, for example, may be utilized to create content in extended reality and/or utilized in (e.g., perform activities) an extended reality. Thus, "extended reality" content may be implemented on various platforms, including a head-mounted device (HMD) connected to a host computer system, a standalone HMD, a mobile device or computing system, or any other hardware platform capable of providing extended reality content to one or more viewers.

FIG. 1 illustrates a cross-section of an example XR display device 100. The XR display device 100 includes an example wearable display 110, which may include at least one waveguide 115. It should be appreciated that the XR display device 100 as illustrated is an example of one embodiment of a head-mounted display (HMD) that may be useful in reducing energy consumption, in accordance with the presently disclosed embodiments. In another embodiment, the XR display device 100 may include a see-through HMD which may not include a waveguide and may instead render images directly onto, for example, one or more transparent or semi-transparent mirrors that may be placed in front of the eyes of a user, for example. FIG. 1 also shows an eyebox 122, which is a location where a user's eye 120 may be positioned with respect to the display 110 when the user wears XR display device 100. For example, as long as the user's eye 120 is aligned with the eyebox 122, the user may be able to see a full-color image, or a pupil replication directed toward the eyebox 122 by the waveguide 115. The waveguide 115 may produce and direct many pupil replications to the eyebox 122. The waveguide 115 may be configured to direct image light 160 to the eyebox 122 located proximate to the user's eye 120. For purposes of illustration, FIG. 1 shows the cross-section associated with a single user's eye 120 and single waveguide 115. In certain embodiments, the waveguide 115 or another waveguide may provide image light to an eyebox located at another eye of the user.

In certain embodiments, the waveguide 115 may be composed of one or more materials (e.g., plastic, glass, and so forth) with one or more refractive indices that effectively minimize the weight and widen a field of view (FOV) of the display 110. In one or more embodiments, the display 110 may include one or more optical elements between the waveguide 115 and the user's eye 120. The optical elements may act to, for example, correct aberrations in the image light 160, magnify the image light 160, make some other optical adjustment of the image light 160, or perform a combination thereof. Examples of optical elements may include an aperture, a Fresnel lens, a refractive (e.g., convex and/or concave) lens, a reflective surface, a filter, or any other suitable optical element that affects image light. The waveguide 115 may include a waveguide with one or more sets of Bragg gratings, for example.

In some embodiments, the display 110 may include a scanline or one-dimensional ("1D") waveguide display. In such an embodiment, a row of a light source may generate the light that is used to illuminate the entire vertical space (or horizontal space, where appropriate) of the display. Multiple smaller images may be combined to form a larger composite image as perceived by the viewer. A scanning element may cause the source light, treated by waveguide components, to be output to the user's eye 120 of the user in a specific pattern corresponding to a generation pattern used by the emitters to optimize display draw rate. For example, the light source may first be provided color values corresponding to a single row of pixels along the top of a display image.

In certain embodiments, the light may be transferred to the appropriate section of the eyebox 122 using a waveguide-based process assisted with a microelectromechanical system (MEMS)-powered oscillating mirror. After a short period of time, the light source may be provided color values corresponding to the next row of pixels (e.g., below the first). The light for this section of the image may then use the same process to position the color values in the appropriate position. Scanning displays may utilize less power to run and may generate less heat than traditional displays comprised of the same emitters. Scanning displays may have less weight as well, owing in part to the quality of the materials used in the scanning element and optics system. The frame rate of the display may be limited based on the oscillation speed of the mirror.

In other embodiments, the display 110 may include a 2D or two-dimensional waveguide display. In such a display, no oscillating mirror is utilized, as a light source may be used that comprises vertical and horizontal components (e.g., in an array). Where the 1D variant lights the display on a row-by-row basis, the 2D variant may be capable of providing a significantly improved frame rate because it is not dependent on the oscillating mirror to provide for the vertical component of an image. To further improve the frame rate, the light source of a 2D waveguide display may be bonded to the controller and/or memory providing driving instructions for the display system. For example, the light source may be bonded to the memory that holds the color instructions for the display and/or the driver transistors. The result of such a configuration is that the light source for such a display may be operable with a considerably faster frame rate.

In certain embodiments, an XR display device 100 may include a light source such as a projector 112 that emits projected light 155 depicting one or more images. Many suitable display light source technologies are contemplated, including, but not limited to, liquid crystal display (LCD), liquid crystal on silicon (LCOS), light-emitting diode (LED), organic LED (OLED), micro-LED (µLED), digital micromirror device (DMD), any other suitable display technology, or any combination thereof. The projected light 155 may be received by a first coupler 150 of the waveguide 115. The waveguide 115 may combine the projected light 155 with a real-world scene 116 (e.g., scene light) received by a second coupler 152. The real-world scene 116 (e.g., scene light) may be, for example, light from a real-world environment, and may pass through a transparent (or semi-transparent) surface 154 to the second coupler 152. The transparent surface 154 may be, for example, a protective curved glass or a lens formed from glass, plastic, or other transparent material.

In certain embodiments, the coupling components of the waveguide 115 may direct the projected light 155 along a total internal reflection path of the waveguide 115. Furthermore, the projected light 155 may first pass through a small air gap between the projector 112 and the waveguide 115 before interacting with a coupling element incorporated into the waveguide (such as the first coupler 150). The light path, in some examples, can include grating structures or other types of light decoupling structures that decouple portions of the light from the total internal reflection path to direct multiple instances of an image, "pupil replications," out of the waveguide 115 at different places and toward the eyebox 122 of the XR display device 100.

In certain embodiments, the real-world scene 116 may be seen by the user's eye 120. For example, as further depicted by FIG. 1, the XR display device 100 may include one or more cameras 126A and 126B. In certain embodiments, the one or more cameras 126A and 126B may include one or more color cameras (e.g., (R)ed, (G)reen, (B)lue cameras), one or monochromatic cameras, or one or more color depth cameras 126B (e.g., RGB-(D) depth cameras) that may be suitable for detecting or capturing the real-world scene 116 (e.g., scene light) and/or certain characteristics of the real-world scene 116 (e.g., scene light). For example, in some embodiments, in order to provide the user with an XR experience, the one or more cameras 126A and 126B may include high-resolution RGB image sensors that may be "ON" (e.g., activated) incessantly, potentially during hours the user spends in extended reality, for example.

In certain embodiments, one or more controllers 130 may control the operations of the projector 112 and the number of cameras 126A and 126B. The controller 130 may generate display instructions for a display system of the projector 112 or image capture instructions for the one or more cameras 126A and 126B. The display instructions may include instructions to project or emit one or more images, and the image capture instructions may include instructions to capture one or more images in a successive sequence, for example. In certain embodiments, the display instructions and image capture instructions may include frame image color or monochromatic data. The display instructions and image capture instructions may be received from, for example, one or more processing devices included in the XR display device 100 of FIG. 1 or in wireless or wired communication therewith. The display instructions may further include instructions for moving the projector 112, for moving the waveguide 115 by activating an actuation system, or for moving or adjusting the lens of one or more of the one or more cameras 126A and 126B. The controller 130 may include a combination of hardware, software, and/or firmware not explicitly shown herein so as not to obscure other aspects of the disclosure.

Figure 2:
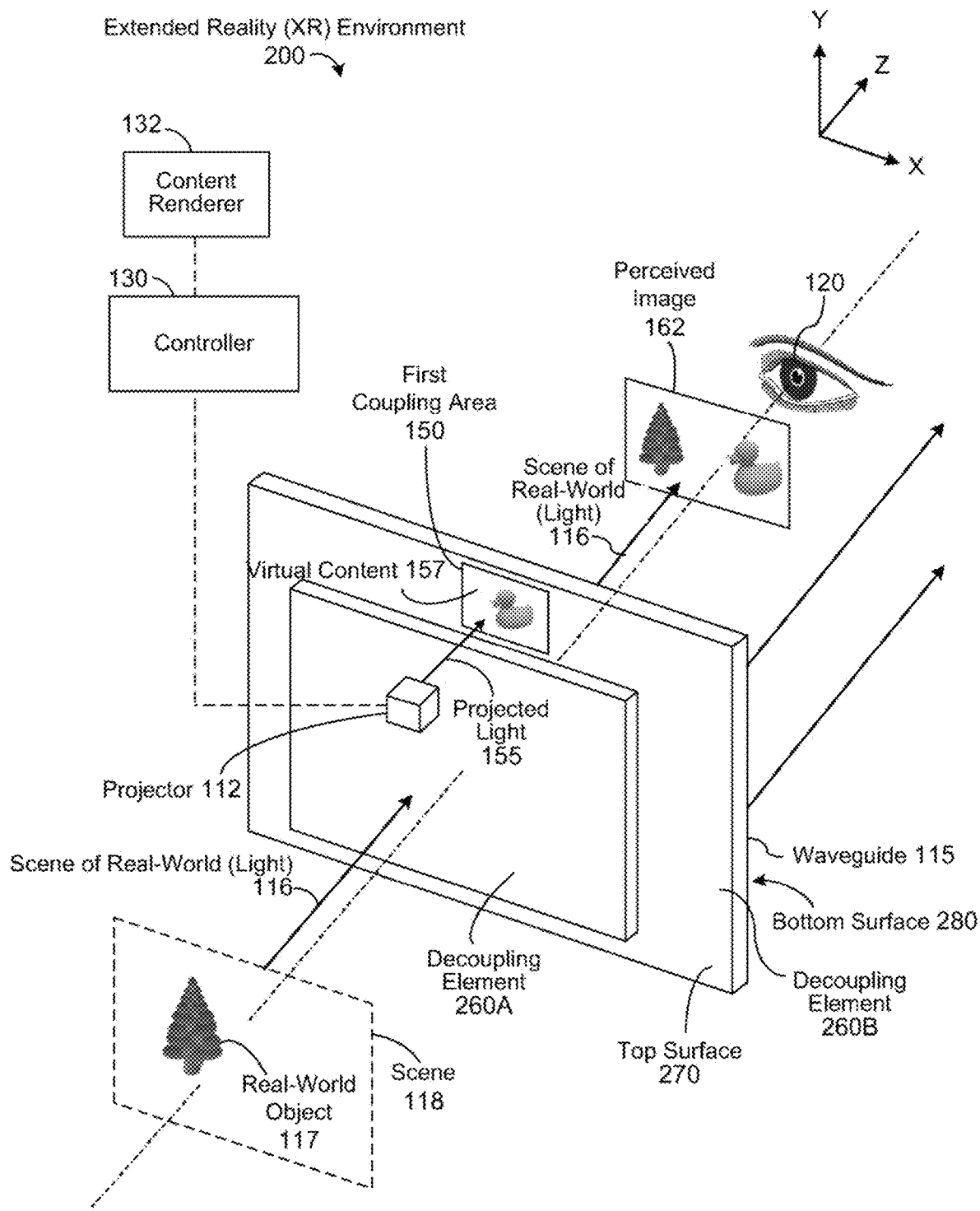
FIG. 2 illustrates an example embodiment of an XR environment.

FIG. 2 illustrates an example isometric view of an XR environment 200. In certain embodiments, the XR environment 200 may be a component of the XR display device 100. The XR environment 200 may include at least one projector 112, a waveguide 115, and a controller 130. A content renderer 132 may generate representations of content, referred to herein as AR virtual content 157, to be projected as projected light 155 by the projector 112. The content renderer 132 may send the representations of the content to the controller 130, which may in turn generate display instructions based on the content and send the display instructions to the projector 112.

For purposes of illustration, FIG. 2 shows the XR environment 200 associated with a single user's eye 120, but in other embodiments another projector 112, waveguide 115, or controller 130 that is completely separate or partially separate from the XR environment 200 may provide image light to another eye of the user. In a partially separate system, one or more components may be shared between the waveguides for each eye. In one embodiment, a single waveguide 115 may provide image light to both eyes of the user. Also, in some examples, the waveguide 115 may be one of multiple waveguides of the XR environment 200. In another embodiment, in which the HMD includes a see-through HMD, the image light may be provided onto, for example, one or more transparent or semi-transparent mirrors that may be placed in front of the eyes of the user.

In certain embodiments, the projector 112 may include one or more optical sources, an optics system, and/or circuitry. The projector 112 may generate and project the projected light 155, including at least one two-dimensional image of virtual content 157, to a first coupling area 150 located on a top surface 270 of the waveguide 115. The image light 155 may propagate along a dimension or axis toward the coupling area 150, for example, as described above with reference to FIG. 1. The projector 112 may comprise one or more array light sources. The techniques and architectures described herein may be applicable to many suitable types of displays, including but not limited to liquid crystal display (LCD), liquid crystal on silicon (LCOS), light-emitting diode (LED), organic LED (OLED), micro-LED (μLED), or digital micromirror device (DMD). It should be appreciated that while one or more embodiments may be discussed herein with respect to an XR display device 100 including multiple distinct displays, in other embodiments, the XR display device 100 may include one single display in which different regions of the display generate content for each of the user's eyes.

In certain embodiments, the waveguide 115 may be an optical waveguide that outputs two-dimensional perceived images 162 in the real-world scene 116 (e.g., scene light with respect to a scene object 117 and scene 118) directed to the eye 120 of a user. The waveguide 115 may receive the projected light 155 at the first coupling area 150, which may include one or more coupling elements located on the top surface 270 and/or within the body of the waveguide 115 and may guide the projected light 155 to a propagation area of the waveguide 115. A coupling element of the coupling area 150 may be, for example, a diffraction grating, a holographic grating, one or more cascaded reflectors, one or more prismatic surface elements, an array of holographic reflectors, a metamaterial surface, or a combination thereof.

In certain embodiments, each of the coupling elements in the coupling area 150 may have substantially the same area along the X-axis and the Y-axis dimensions, and may be separated by a distance along the Z-axis (e.g., on the top surface 270 and the bottom surface 280, or both on the top surface 270 but separated by an interfacial layer (not shown), or on the bottom surface 280 and separated with an interfacial layer or both embedded into the body of the waveguide 115 but separated with the interfacial layer). The coupling area 150 may be understood as extending from the top surface 270 to the bottom surface 280. The coupling area 150 may redirect received projected light 155, according to a first grating vector, into a propagation area of the waveguide 115 formed in the body of the waveguide 115 between decoupling elements 260.

A decoupling element 260A may redirect the totally internally reflected projected light 155 from the waveguide 115 such that the light 155 may be decoupled through a decoupling element 260B. The decoupling element 260A may be part of, affixed to, or formed in, the top surface 270 of the waveguide 115. The decoupling element 260B may be part of, affixed to, or formed in, the bottom surface 280 of the waveguide 115, such that the decoupling element 260A is opposed to the decoupling element 260B with a propagation area extending therebetween. The decoupling elements 260A and 260B may be, for example, a diffraction grating, a holographic grating, an array of holographic reflectors, etc., and together may form a decoupling area. In certain embodiments, each of the decoupling elements 260A and 260B may have substantially the same area along the X-axis and the Y-axis dimensions and may be separated by a distance along the Z-axis.

Figure 3:
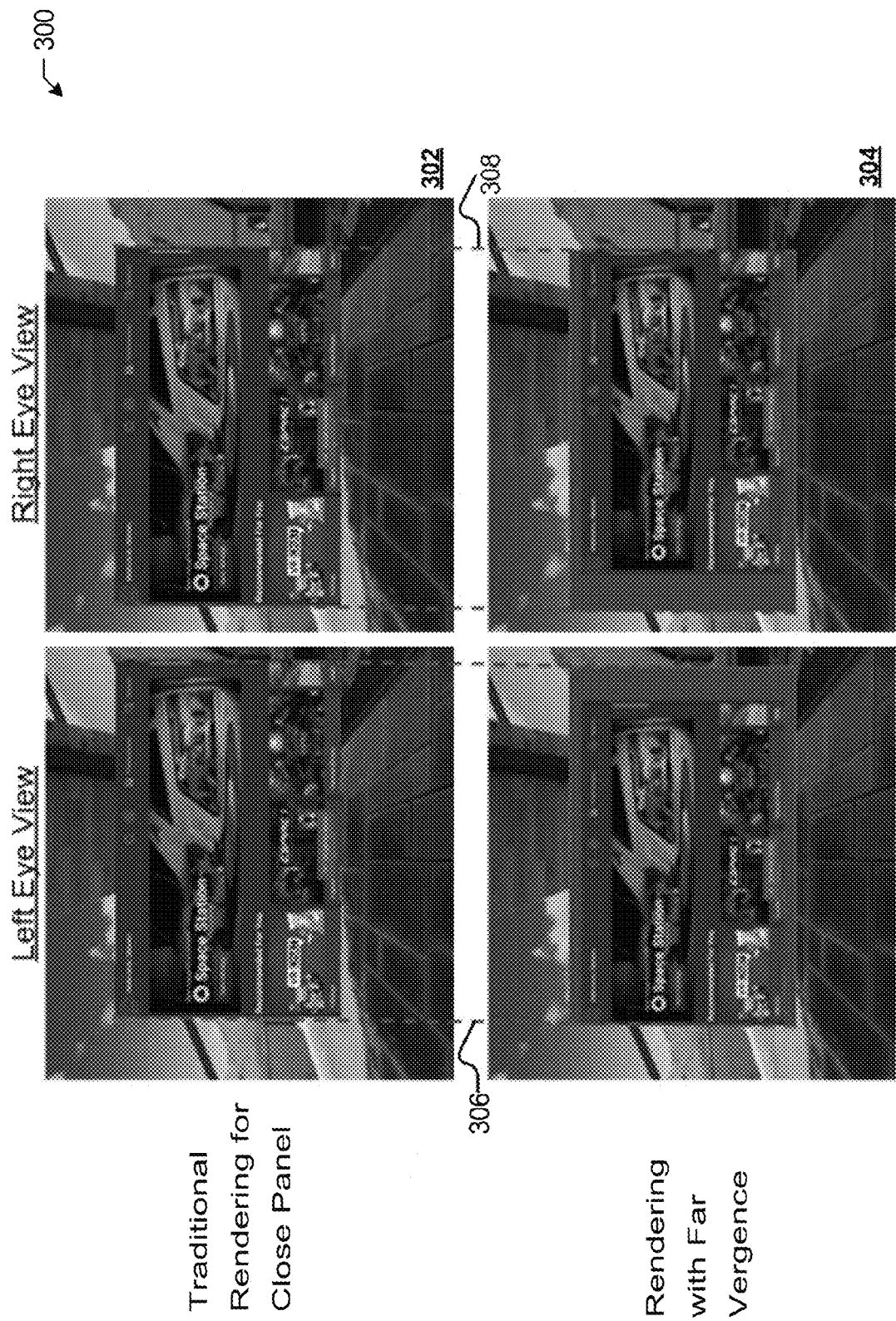
FIG. 3 illustrates one or more running examples of the vergence distance embodiments described herein.

FIG. 3 illustrates one or more running examples 300 of the vergence distance embodiments described herein. For example, the example diagrams 302 illustrate the view for traditional rendering while the example diagrams 304 illustrate the present vergence distance rendering techniques. Example diagrams 304 depict that the virtual panel (e.g., 2D virtual surface, which may be rendered on a flat or curved 3D surface in the XR environment 200) occupies the same portion of the field of view (FOV) for each user's eye as traditional rendering, which is consistent with the virtual panel's desired close distance. In certain embodiments, as the user moves within the XR environment, the panel's boundary may be consistent with a 2D monitor placed at a particular position within the XR environment. With the present vergence distance rendering techniques, the 2D content may be shifted within the quad toward the user's ears (e.g., left in the left eye image). In certain embodiments, as the 2D content is shifted, a uniform color region is drawn nasally (e.g., right side of left eye image). In the illustrated example diagrams 304, 2D content has been shrunk to allow displacement without clipping (e.g., although clipping could alternatively occur at the risk of binocular rivalry). Further, each of the pairs of lines 306 and 308 passes through an icon on the close panel for its corresponding eye and then crossing at the distant plane at the top. Therefore, a user looking into the panel appears to see the panel's content at a farther vergence distance in accordance with the presently disclosed embodiments. In some embodiments, the content may be shifted in the opposite direction in each image to provide a closer vergence distance in accordance with the presently disclosed embodiments.

Figure 4:
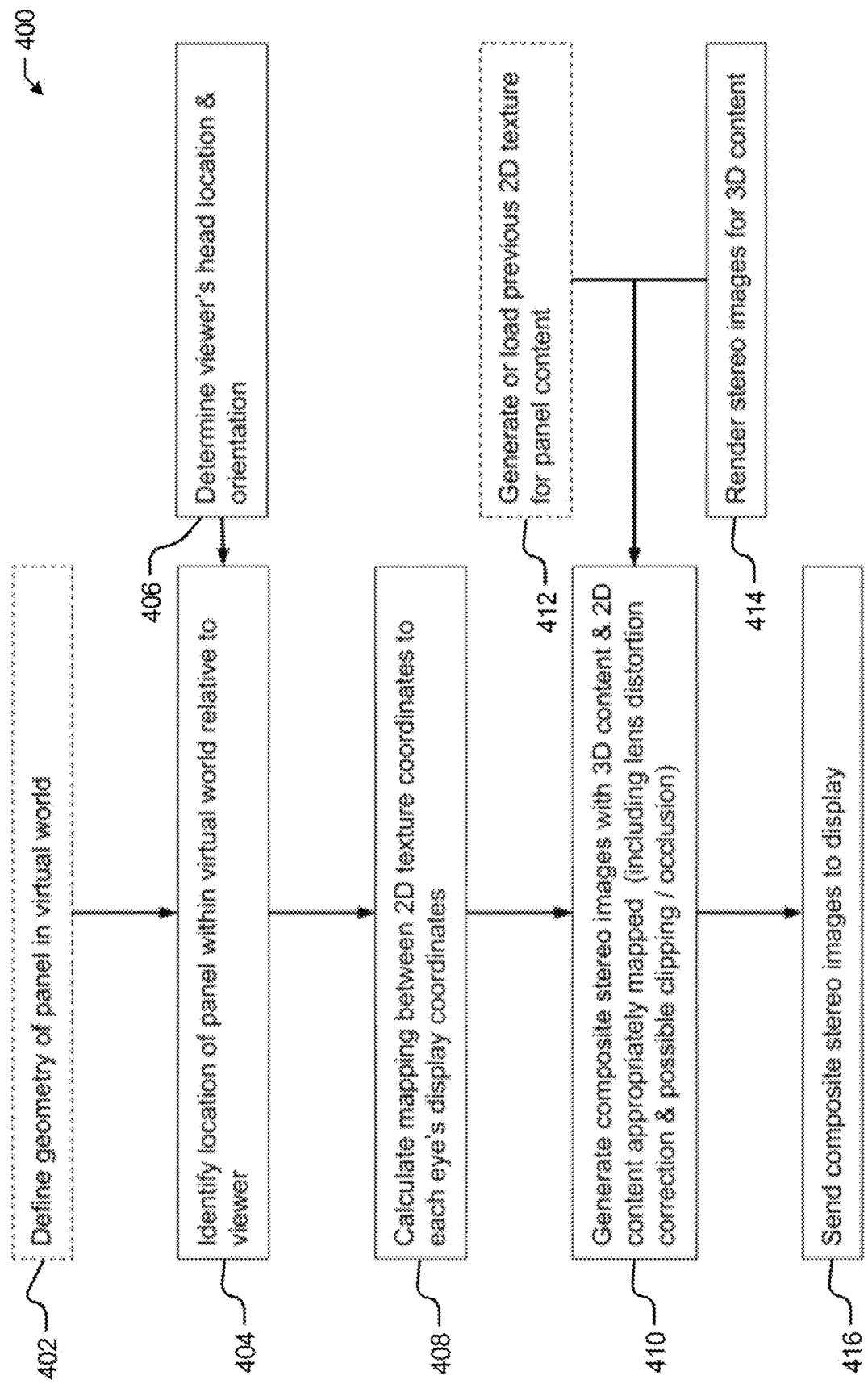
FIG. 4 illustrates an example workflow diagram for providing displays with images requiring certain vergence distance for extended reality (XR) devices.

FIG. 4 illustrates an example workflow diagram 400 for providing displays with images requiring vergence distance for extended reality (XR) devices, in accordance with presently disclosed techniques. The workflow diagram 400 may be performed utilizing one or more processing devices (e.g., XR display device 100) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

In certain embodiments, the workflow diagram 400 may include defining (at functional block 402) defining a geometry of the displays 110 of XR display device 100 within the XR environment 200. For example, in some embodiments, the geometry of the displays 110 of XR display device 100 may include a location, an orientation, and shape of a 2D surface. In certain embodiments, the workflow diagram 400 may include identifying (at functional block 404) a location of the displays of XR display device 100 within the XR environment and relative to each user's eye 120. For example, in some embodiments, the workflow diagram 400 may detect (at functional block 406) a head pose of the user from one or more head tracking cameras of the XR display device 100. In one embodiment, the head pose of the user may be predicted for the time when the frames are to be displayed on the displays 110. Specifically, in some embodiments, images to be rendered may be mapped and/or warped (e.g., perspective projection) to the display so that objects appear at their correct angle relative to the user, for example. Similarly, on the display, the position of the user's eye and the lens geometric distortion may be accounted for.

In certain embodiments, the workflow diagram 400 may include calculating (at functional block 408) a mapping between 2D texture coordinates with respect to each user eye 120 on the displays 110. For example, in some embodiments, the XR display device may utilize a displacement equation to calculate the mapping based on, for example, a desired vergence distance, a head location of the user, an interpupillary distance, and a head roll of the user. In one embodiment, for a display 110 with a desired vergence distance farther than the distance of the display 110 in the XR environment 200, the virtual content on the displays 110 corresponding to each user's eye 120 may be displaced temporally (e.g., towards the user's ears). In certain embodiments, the workflow diagram 400 may include generating (at functional block 410) composite virtual content with 3D virtual content and 2D virtual content each accurately mapped based on the mapping calculated at functional block 408.

For example, in some embodiments, the XR display device 100 may generate (at functional block 412) the 2D pixels or textures for the 2D virtual content to be displayed by displays 110 and generate (at functional block 414) the 3D stereo images for the 3D virtual content to be displayed by displays 110. In some embodiments, it may not be necessary to load the 2D virtual content each frame if the 2D virtual content already exists in memory and no update has occurred since 2D virtual content was previously loaded. In certain embodiments, the 3D stereo images may be rendered at display rate for all of the 3D virtual content in the XR environment 200. In certain embodiments, the workflow diagram 400 may include providing (at functional block 416) the generated composite virtual content having both the 3D virtual content and the 2D virtual content accurately mapped to be rendered on the displays 110.

For example, in some embodiments, the XR display device 100 may merge together the 2D virtual content generated at functional block 412 and the 3D virtual content generated at functional block 414, and further adjust the 3D virtual content and the 2D virtual content for proper display by the displays 110 (e.g., lens distortion correction). In some embodiments, it may be desirable to limit the location of the 2D virtual content to the position within the 3D virtual content corresponding to the virtual location of the displays 110 (e.g., clipping content that appears on the edges of the 2D texture on the temporal side of each user's eye 120). In certain embodiments, to compensate for or avoid clipping, for example, it may be desirable to reduce the size of the 2D virtual content as it would appear on displays 110 to each user's eye 120.

Figure 5:
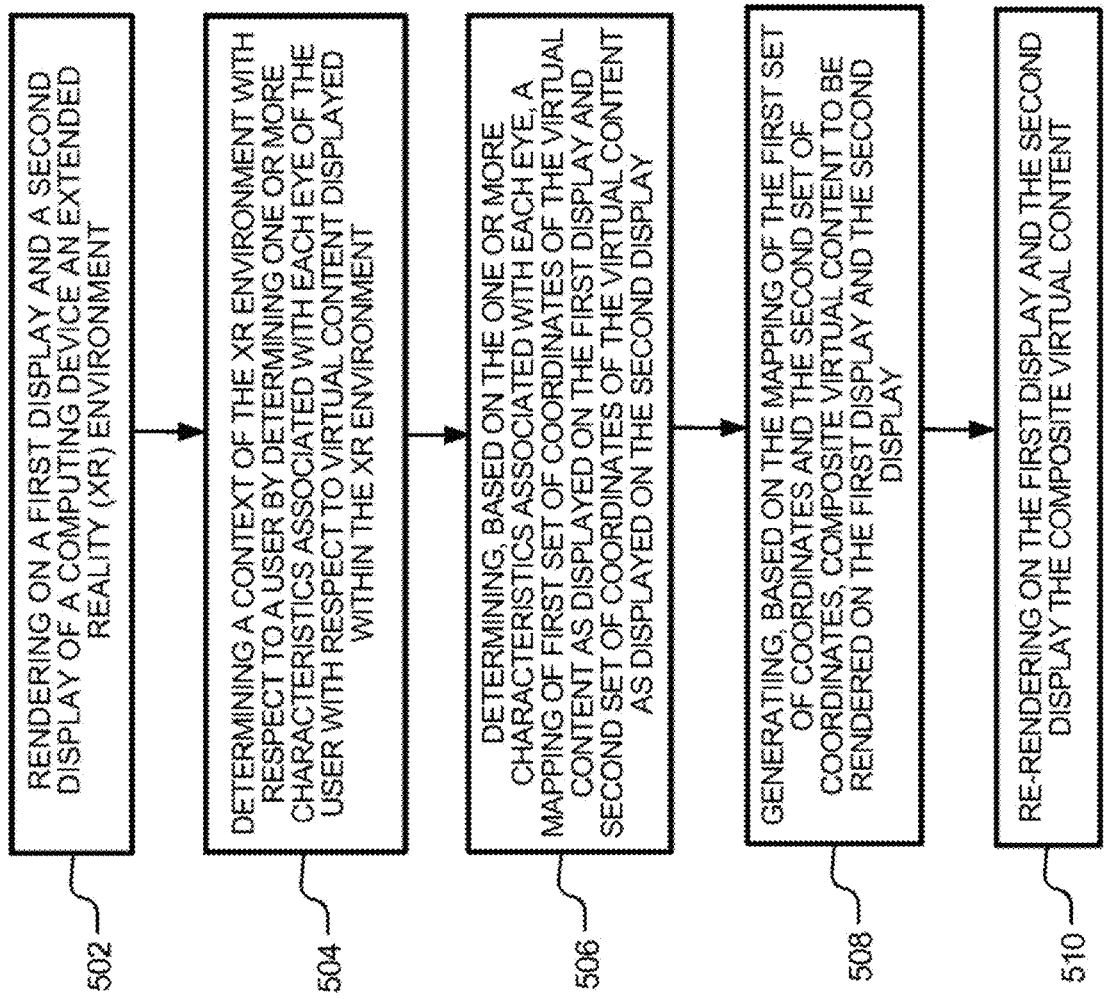
FIG. 5 illustrates a flow diagram of a method for providing displays with images requiring certain vergence distance for extended reality (XR) devices.

FIG. 5 illustrates a flow diagram of a method 500 for providing displays with images requiring vergence distance for extended reality (XR) devices, in accordance with presently disclosed techniques. The method 500 may be performed utilizing one or more processing devices (e.g., XR display device 100) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 500 may begin at block 502 with one or more processing devices (e.g., XR display device 100) rendering on a first display and a second display of the computing device an XR environment. The method 500 may then continue at block 504 with the one or more processing devices (e.g., XR display device 100) determining a context of the XR environment with respect to the user. For example, in some embodiments, determining the context may include determining one or more characteristics associated with each eye of the user with respect to virtual content displayed within the XR environment. The method 500 may then continue at block 506 with the one or more processing devices (e.g., XR display device 100) determining, based on the one or more characteristics associated with each eye of the user, a mapping of a first set of coordinates of the virtual content as displayed on the first display and a second set of coordinates of the virtual content as displayed on the second display.

For example, in some embodiments, determining the mapping of the first set of coordinates and the second set of coordinates may include determining one or more of a desired vergence distance, a desired interpupillary distance, a user's head location, or a user's head roll. The method 500 may then continue at block 508 with the one or more processing devices (e.g., XR display device 100) generating, based on the mapping of the first set of coordinates and the second set of coordinates, composite virtual content to be shown on the first display and the second display. For example, in some embodiments, generating the composite virtual content to be shown on the first display and the second display may include generating and merging together 2D content of the virtual content and 3D content of the virtual content. The method 500 may then conclude at block 510 with one or more processing devices (e.g., XR display device 100) re-rendering on the first display and the second display the composite virtual content.

Figure 6:
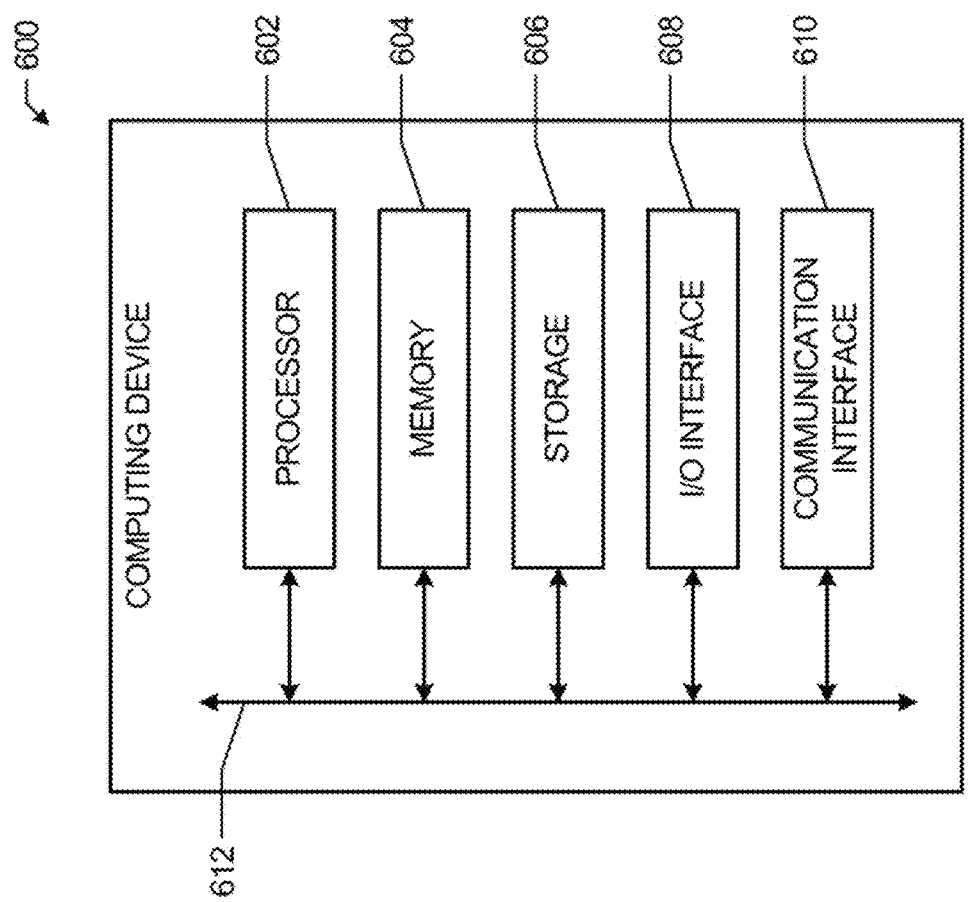
FIG. 6 illustrates an example computer system.

FIG. 6 illustrates an example computer system 600 that may be useful in performing one or more of the forgoing techniques as presently disclosed herein. In certain embodiments, one or more computer systems 600 perform one or more steps of one or more methods described or illustrated herein. In certain embodiments, one or more computer systems 600 provide functionality described or illustrated herein. In certain embodiments, software running on one or more computer systems 600 performs one or more steps of one or more methods described or illustrated herein or provides functionality described or illustrated herein. Certain embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein.

As an example, and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate. In certain embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In certain embodiments, processor 602 includes hardware for executing instructions, such as those making up a computer program. As an example, and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In certain embodiments, processor 602 may include one or more internal caches for data, instructions, or addresses. This disclosure contemplates processor 602 including any suitable number of any suitable internal caches, where appropriate. As an example, and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602.

Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In certain embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In certain embodiments, memory 604 includes main memory for storing instructions for processor 602 to execute or data for processor 602 to operate on. As an example, and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In certain embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere).

One or more memory buses (which may each include an address bus and a data bus) may couple processor 602 to memory 604. Bus 612 may include one or more memory buses, as described below. In certain embodiments, one or more memory management units (MMUs) reside between processor 602 and memory 604 and facilitate accesses to memory 604 requested by processor 602. In certain embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In certain embodiments, storage 606 includes mass storage for data or instructions. As an example, and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In certain embodiments, storage 606 is non-volatile, solid-state memory. In certain embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In certain embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In certain embodiments, communication interface 610 includes hardware, software, or both providing one or more interfaces for communication (such as, for example, packet-based communication) between computer system 600 and one or more other computer systems 600 or one or more networks. As an example, and not by way of limitation, communication interface 610 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 610 for it.

As an example, and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In certain embodiments, bus 612 includes hardware, software, or both coupling components of computer system 600 to each other. As an example, and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates certain embodiments as providing particular advantages, certain embodiments may provide none, some, or all of these advantages.

What is claimed is:

1. A method, comprising:
    rendering virtual content that is projected on a first display and a second display of a head-wearable device that causes presentation of an extended reality (XR) environment;
    determining a context of the XR environment with respect to a wearer of the head-wearable device, wherein determining the context comprises determining one or more characteristics associated with each eye of the wearer with respect to the virtual content displayed within the XR environment as presented by the first display and the second display;
    determining, based on the one or more characteristics associated with each eye of the wearer, a mapping of a first set of coordinates of the virtual content as presented by the first display with respect to first characteristics of the first display and a mapping of a second set of coordinates of the virtual content as presented by the second display with respect to second characteristics of the second display;

generating, based on the mapping of the first set of coordinates of the virtual content and the mapping of the second set of coordinates of the virtual content, composite virtual content to be projected on the first display and the second display; and rendering the composite virtual content for projection on the first display and the second display of the head-wearable device.

2. The method of claim 1, further comprising:

prior to rendering the virtual content that is projected on the first display and the second display, determining a geometry of the first display and the second display, wherein the first characteristics of the first display and the second characteristics of the second display are based on the geometry of the first display and the second display of the head-wearable device.

3. The method of claim 2, wherein determining the geometry of the first display and the second display comprises determining one or more of a location of the first display and the second display, an orientation of the first display and the second display, or a shape of the first display and the second display.

4. The method of claim 1, wherein determining the context of the XR environment with respect to the wearer comprises determining one or more of a head pose of the wearer or an eye gaze of the wearer.

5. The method of claim 1, wherein determining the mapping of the first set of coordinates of the virtual content and the mapping of the second set of coordinates of the virtual content comprises determining one or more of a desired vergence distance or a desired interpupillary distance for the wearer.

6. The method of claim 1, further comprising:

prior to rendering the composite virtual content to be projected on the first display and the second display, generating, based on the mapping of the first set of coordinates and the second set of coordinates, two-dimensional (2D) content of the virtual content and three-dimensional (3D) content of the virtual content.

7. The method of claim 6, wherein rendering the composite virtual content to be projected on the first display and the second display comprises merging together the 2D content of the virtual content and the 3D content of the virtual content.

8. A head-wearable device configured to be worn by a user, comprising:

a first display;

a second display;

one or more non-transitory computer-readable storage media including instructions;

and one or more processors coupled to the first display and the second display, the one or more processors configured to execute the instructions to:

render virtual content that is projected on a first display and a second display of a head-wearable device that causes presentation of an extended reality (XR) environment;

determine a context of the XR environment with respect to a wearer of the head-wearable device, wherein determining the context comprises determining one or more characteristics associated with each eye of the wearer with respect to the virtual content displayed within the XR environment as presented by the first display and the second display;

determine, based on the one or more characteristics associated with each eye of the wearer, a mapping of a first set of coordinates of the virtual content as presented by the first display with respect to first characteristics of the first display and a mapping of a second set of coordinates of the virtual content as presented by the second display with respect to second characteristics of the second display;

generate, based on the mapping of the first set of coordinates of the virtual content and the second set of coordinates of the virtual content, composite virtual content to be rendered projected on the first display and the second display of the head-wearable device; and render the composite virtual content for projection on the first display and the second display of the head-wearable device.

9. The head-wearable device of claim 8, wherein the one or more processors are further configured to:

prior to rendering the virtual content that is projected on the first display and the second display, determine a geometry of the first display and the second display, wherein the first characteristics of the first display and the second characteristics of the second display are based on the geometry of the first display and the second display of the head-wearable device.

10. The head-wearable device of claim 9, wherein the one or more processors are further configured to determine the geometry of the first display and the second display determining one or more of a location of the first display and the second display, an orientation of the first display and the second display, or a shape of the first display and the second display.

11. The head-wearable device of claim 8, wherein determining the context of the XR environment with respect to the user further comprises determining one or more of a head pose of the user or an eye gaze of the wearer.

12. The head-wearable device of claim 8, wherein the one or more processors are further configured to determine the mapping of the first set of coordinates and the mapping of the second set of coordinates based on determining one or more of a desired vergence distance or a desired interpupillary distance for the wearer of the head-wearable device.

13. The head-wearable device of claim 8, wherein the one or more processors are further configured to:

prior to rendering the composite virtual content to be projected on the first display and the second display, generate, based on the mapping of the first set of coordinates and the second set of coordinates, two-dimensional (2D) content of the virtual content and three-dimensional (3D) content of the virtual content.

14. The head-wearable device of claim 13, wherein the one or more processors are further configured to generate the composite virtual content to be projected on the first display and the second display based on merging together the 2D content of the virtual content and the 3D content of the virtual content.

15. A non-transitory computer-readable medium comprising instructions that, when executed by one or more processors of a head-wearable device configured to be worn by a user, cause the head-wearable device to:

render virtual content that is projected on a first display and a second display of the head-wearable device that causes presentation of an extended reality (XR) environment;

determine a context of the XR environment with respect to a wearer of the head-wearable device, wherein determining the context comprises determining one or more characteristics associated with each eye of the wearer with respect to the virtual content displayed within the XR environment as presented by the first display and the second display;

determine, based on the one or more characteristics associated with each eye of the wearer of the head-wearable device, a mapping of a first set of coordinates of the virtual content as presented by the first display with respect to first characteristics of the first display and a mapping of a second set of coordinates of the virtual content as presented by the second display with respect to second characteristics of the second display;

generate, based on the mapping of the first set of coordinates of the virtual content and the second set of coordinates of the virtual content, composite virtual content to be projected on the first display and the second display of the head-wearable device; and render the composite virtual content for projection on the first display and the second display of the head-wearable device.

16. The non-transitory computer-readable medium of claim 15, wherein the instructions further cause the head-wearable device to:

prior to rendering the virtual content that is projected on the first display and the second display, determine a geometry of the first display and the second display, wherein the first characteristics of the first display and the second characteristics of the second display are based on the geometry of the first display and the second display of the head-wearable device.

17. The non-transitory computer-readable medium of claim 16, wherein the instructions to determine the geometry of the first display and the second display further cause the head-wearable device to determine one or more of a location of the first display and the second display, an orientation of the first display and the second display, or a shape of the first display and the second display.

18. The non-transitory computer-readable medium of claim 15, wherein the instructions to determine the context of the XR environment with respect to the wearer further cause the head-wearable device to determine one or more of a head pose of the user or an eye gaze of the user.

19. The non-transitory computer-readable medium of claim 15, wherein the instructions to determine the mapping of the first set of coordinates and the mapping of the second set of coordinates further cause the head-wearable device to determine one or more of a desired vergence distance or a desired interpupillary distance for the wearer of the head-wearable device.

20. The non-transitory computer-readable medium of claim 15, wherein the instructions further cause the head-wearable device to:

prior to rendering the composite virtual content to be projected on the first display and the second display, generate, based on the mapping of the first set of coordinates and the second set of coordinates, two-dimensional (2D) content of the virtual content and three-dimensional (3D) content of the virtual content.

* * * * *